United States Patent
Araki et al.

(10) Patent No.: US 10,579,275 B2
(45) Date of Patent: Mar. 3, 2020

(54) STORAGE SYSTEM AND STORAGE CONTROL METHOD

(71) Applicant: Hitachi, Ltd., Chiyoda-ku, Tokyo (JP)

(72) Inventors: Akihiko Araki, Tokyo (JP); Yusuke Nonaka, Tokyo (JP); Noboru Morishita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 316 days.

(21) Appl. No.: 15/579,893

(22) PCT Filed: Jul. 27, 2015

(86) PCT No.: PCT/JP2015/071252
§ 371 (c)(1),
(2) Date: Dec. 5, 2017

(87) PCT Pub. No.: WO2017/017763
PCT Pub. Date: Feb. 2, 2017

(65) Prior Publication Data
US 2018/0173721 A1 Jun. 21, 2018

(51) Int. Cl.
*G06F 3/06* (2006.01)
*G06F 16/182* (2019.01)
(Continued)

(52) U.S. Cl.
CPC .......... *G06F 3/0613* (2013.01); *G06F 3/061* (2013.01); *G06F 3/0604* (2013.01);
(Continued)

(58) Field of Classification Search
CPC .................. G06F 3/061; G06F 3/0613
See application file for complete search history.

(56) References Cited

U.S. PATENT DOCUMENTS 5,761,411 A * 6/1998 Teague .................. G06F 11/004
714/42
6,141,287 A * 10/2000 Mattausch .............. G11C 11/41
365/230.03

(Continued)

FOREIGN PATENT DOCUMENTS

WO 2014/118870 A1 8/2014

*Primary Examiner* — William Spieler
(74) *Attorney, Agent, or Firm* — Procopio, Cory, Hargreaves & Savitch LLP

(57) ABSTRACT

This storage system comprises a block interface, a block control unit, a file control unit, and shared memory. The file control unit and block control unit are coupled via a first memory-through path structured to pass through a first area of the shared memory, and via a second memory-through path structured to pass through a second area of the shared memory. The block control unit has a protocol control unit and a virtual driver; exchanges control information for the file control unit with the file control unit via the first memory-through path; uses the virtual driver to convert an I/O request passed from the file control unit via the second memory-through path and processes the result with a protocol processing unit; and bypasses the virtual driver and uses the protocol processing unit to process a block I/O request transferred from the block interface via a physical path.

10 Claims, 9 Drawing Sheets

(51) Int. Cl.
*G06F 16/176* (2019.01)
*H04L 29/06* (2006.01)
*H04L 29/08* (2006.01)

(52) U.S. Cl.
CPC .......... *G06F 3/0607* (2013.01); *G06F 3/0635* (2013.01); *G06F 3/0643* (2013.01); *G06F 3/0659* (2013.01); *G06F 3/0661* (2013.01); *G06F 3/0662* (2013.01); *G06F 3/0664* (2013.01); *G06F 3/0689* (2013.01); *G06F 16/176* (2019.01); *G06F 16/182* (2019.01); *H04L 67/1097* (2013.01); *H04L 69/08* (2013.01)

(56) References Cited

U.S. PATENT DOCUMENTS

| | | | | |
|---|---|---|---|---|
| 6,978,342 | B1* | 12/2005 | Estakhri | G06F 3/0613 711/103 |
| 2004/0064590 | A1* | 4/2004 | Starr | H04L 29/06 709/250 |
| 2005/0228937 | A1* | 10/2005 | Karr | G06F 3/0607 711/6 |
| 2006/0129749 | A1* | 6/2006 | Nakanishi | G06F 3/0613 711/103 |
| 2012/0131286 | A1* | 5/2012 | Faith | G06F 3/0613 711/154 |

* cited by examiner

I/O path definition table 112

| I/O path number (221) | I/O path type (222) | Initiator (223) | Logical VOL number (224) |
|---|---|---|---|
| 1 | Physical I/O path 301A | Block I/F 108 | 10,11,12 |
| 2 | Physical I/O path 301B | File I/F 109 | 101,102,103 |
| 3 | Logical I/O path 303 | File control unit 130 | 201 |

FIG. 3

I/O path definition table

| I/O path number | I/O path type | Initiator | Logical VOL number |
|---|---|---|---|
| 1 | Physical I/O path 301A | Block I/F 108 | 10,11,12 |
| 2 | Logical I/O path 305 | File control unit 130 | 101,102,103 |
| 3 | Logical I/O path 303 | File control unit 130 | 201 |

FIG. 6

STORAGE SYSTEM AND STORAGE CONTROL METHOD

CROSS-REFERENCE TO RELATED APPLICATIONS

This application is a U.S. National Stage entry of PCT Application No: PCT/JP2015/071252 filed Jul. 27, 2015, the contents of which are incorporated herein by reference.

TECHNICAL FIELD

The present invention generally relates to storage control, and relates to a technology of a storage system, for example.

BACKGROUND ART

An integrated storage system capable of coping with a plurality of types of protocols such as FCP (Fibre Channel Protocol for SCSI), iSCSI (internet SCSI), CIFS (Common Internet File System), and NFS (Network File System) is gathering attention. Such an integrated storage system is called a unified storage and have advantages such as space saving, a low cost, and improved workability (PTL 1). FCP and iSCSI are protocols for accessing a storage apparatus in units of blocks (hereinafter this access will be referred to as a "block access" hereinafter). CIFS and NFS are protocols for accessing a storage apparatus in units of files (hereinafter this access will be referred to as a "file access"). PTL 1 discloses a computer provided with a host OS including a block processing unit that reads and writes data in units of blocks, a virtual OS including a file server that transmits and receives data in units of files, and an inter-OS communication path through which the host OS and the virtual OS perform communication.

CITATION LIST

Patent Literature

[PTL 1]
WO2014/118870

SUMMARY OF INVENTION

Technical Problem

A unified storage which includes a block I/F that provides an I/F (InterFace) for block accesses to a host computer, a block control unit that processes block accesses, a file I/F that provides an I/F for file accesses to the host computer, and a file control unit that processes file accesses and in which these modules are coupled by an internal bus such as PCIe (PCI-Express) may be considered. Since the internal bus has a finite bandwidth, when a large amount of data (for example, control data or the like exchanged within the unified storage) other than I/O (Input/Output) data from the host computer is transferred in the internal bus, an I/O performance of the unified storage with respect to the host computer decreases. Moreover, in the unified storage, the block control unit, the file control unit, and the like exchange control data of various other purposes. Therefore, the I/O performance of the unified storage decreases unless control data is dealt with appropriately according to respective purposes.

The present invention has been made in view of the problems, and an object thereof is to enhance an I/O performance of a unified storage with respect to a host computer.

Solution to Problem

A storage system according to an embodiment includes: a block control unit that controls a block I/O request; a file control unit that provides a file server to a host computer; and a first shared memory that is shared by the block control unit and the file control unit. The file control unit and the block control unit are coupled by: a first memory-through path structured so as to pass through a first area of the first shared memory; and a second memory-through path structured so as to pass through a second area of the first shared memory, the second memory-through path being faster than the first memory-through path.

The block control unit exchanges control information on control of the file control unit with the file control unit via the first memory-through path and exchanges data associated with I/O of the file control unit with the file control unit via the second memory-through path.

Advantageous Effects of Invention

According to the present invention, it is possible to enhance an I/O performance of a unified storage with respect to a host computer.

BRIEF DESCRIPTION OF DRAWINGS

FIG. 3 illustrates a configuration example of an I/O path definition table.

FIG. 6 illustrates a configuration example of an I/O path definition table according to Embodiment 2.

DESCRIPTION OF EMBODIMENTS

Figure 1:
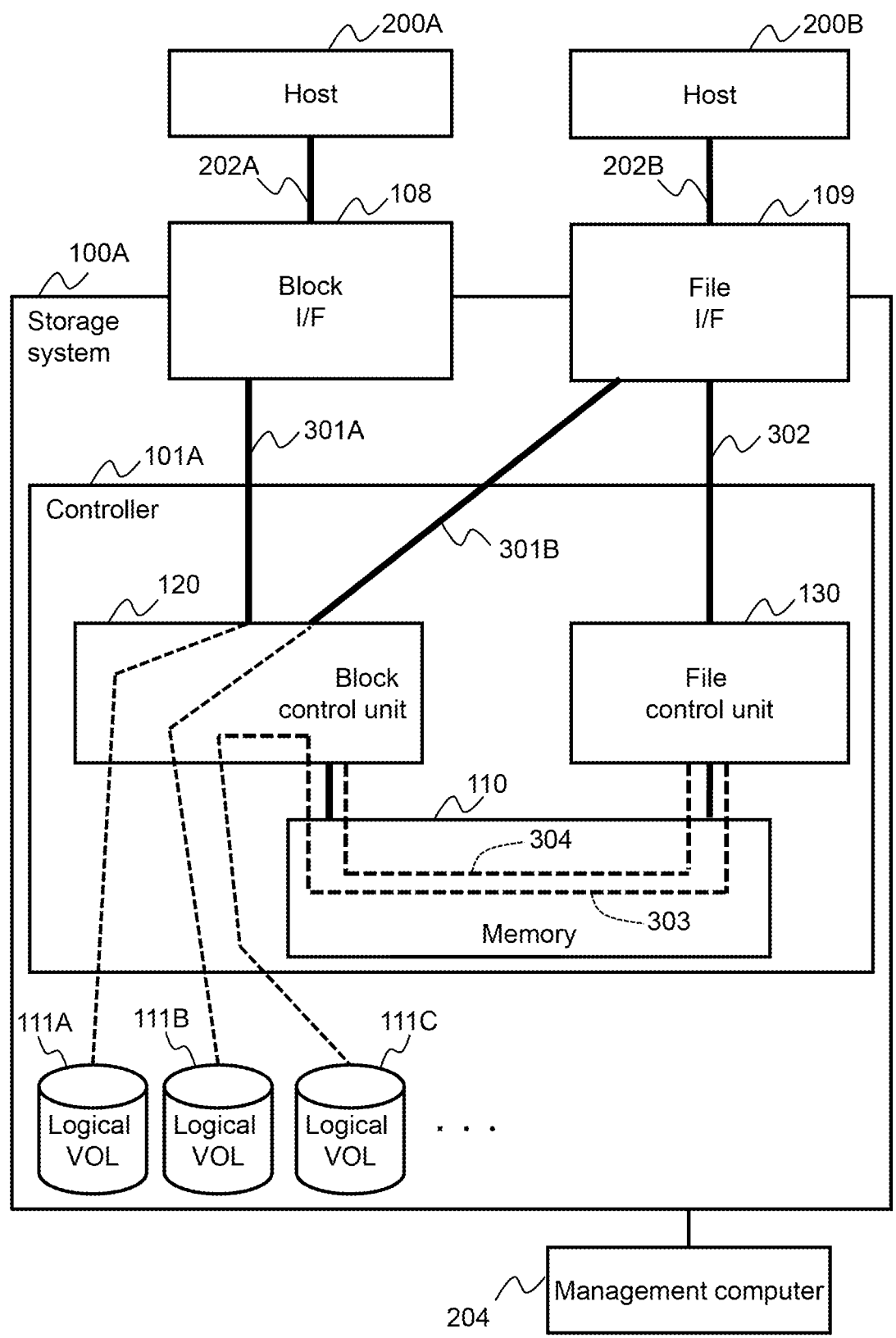
FIG. 1 illustrates a configuration example of a storage system according to Embodiment 1.

Hereinafter, embodiments will be described. In the following description, although information is sometimes described using an expression such as an "xxx table", an "xxx queue", or an "xxx list", the information may be expressed by any data structure. That is, the "xxx table", the "xxx queue", or the "xxx list" can be referred to as "xxx information" to show that the information does not depend on the data structure.

In the following description, there may be cases where a process is described using a "program" as the subject. However, since the process is performed while using at least one of a storage resource (for example, a memory) and a communication interface device as necessary when a program is executed by a processor (for example, CPU (Central Processing Unit)), the processor or an apparatus having the processor may also be used as the subject of the process. A part or all of the processes performed by the processor may be performed by a hardware circuit. A computer program may be installed from a program source. The program source may be a program distribution server or a storage medium (for example, a portable storage medium).

In the following description, a set of one or more computers that manage at least one apparatus included in a computer system is sometimes referred to as a "management system". When a management computer displays the display information, the management computer may be a management system. Moreover, a combination of the management computer and the display computer may be a management system. Moreover, a plurality of computers may perform the analyzing and displaying processes in order to improve the speed and the reliability of the analyzing process. In this case, the plurality of computers (including the display computer when the display computer displays the display information) may be a management system. In the present embodiment, the management computer is a management system. Moreover, the management computer displaying information may mean displaying information on a display device included in the management computer and may mean transmitting display information to a display computer (for example, a client) coupled to the management computer (for example, a server). In the latter case, the display computer displays information indicated by the display information on the display device included in the display computer.

Moreover, in the following description, when the same types of elements are distinguished from each other, reference numerals may be used like "xxx 101A" and "xxx 101B" and when the same types of elements are not distinguished from each other, only a common number in the reference numerals may be used like "xxx 101".

Embodiment 1

FIG. 1 illustrates a configuration example of a storage system according to Embodiment 1.

A storage system 100A includes a controller 101A, a block I/F 108, a file I/F 109, and logical VOLs (Volumes) 111A, 111B, and 111C. The logical VOLs 111A, 111B, and 111C may be configured as storage areas included in one or more storage apparatuses. The logical VOLs 111A, 111B, and 111C may be storage areas constructed logically by a RAID (Redundant Arrays of Inexpensive Disks) technology. Examples of the storage apparatus include an HDD (Hard Disk Drive) and an SSD (Solid State Drive).

The controller 101A includes a memory 110, a block control unit 120, and a file control unit 130. The block control unit 120 may be a function realized when a CPU executes a computer program for block accesses. The file control unit 130 may be a function realized when a CPU executes a computer program for file accesses. Both the block control unit 120 and the file control unit 130 may be realized by one CPU, and a CPU that realizes the block control unit 120 and a CPU that realizes the file control unit 130 may be provided separately. Moreover, at least a portion of at least one of the block control unit 120 and the file control unit 130 may be realized as integrated circuits for specific purposes such as an FPGA (Field Programmable Gate Array) or an ASIC (Application Specific Integrated Circuit). The block control unit 120 and the file control unit 130 may operate independently. Examples of the memory 110 include a DRAM (Dynamic Random Access Memory), a FeRAM (Ferroelectric Random Access Memory), and an MRAM (Magnetoresistive Random Access Memory).

The storage system 100A may include a plurality of controllers 101A to ensure redundancy.

The block I/F 108 is coupled so as to be able to perform bidirectional communication with the host computer 200A via a network 202A. Examples of a communication protocol which involves communication via the network 202A include FCP and iSCSI.

The block I/F 108 is coupled so as to be able to perform bidirectional communication with the block control unit 120 via a physical I/O path (referred to as a "physical I/O path") 301A. The physical I/O path 301A is constructed on an internal bus. The internal bus is a PCIe bus, for example. Data associated with a SCSI protocol may be transferred on the physical I/O path 301A. The block I/F 108 may be a hardware module that includes a processor, a memory, and the like. The block I/F 108 is an HBA (Host Bus Adapter) that converts the FCP (or iSCSI) protocol to the PCIe protocol or vice versa.

The host computer 200A may transmit a block access request which is a block-based access request to the block I/F 108 via the network 202A. The block access request may be referred to as a block I/O request. The data written or read by the block I/O request may be referred to as block I/O data. The block access request may be a request that designates an access destination block of the logical VOL 111A according to the SCSI. Examples of the block access request include a block read request and a block write request. The data read by the block read request may be referred to as block read data. The data written by the block write request may be referred to as block write data. The block I/F 108 transfers the block access request received from the host computer 200A to the block control unit 120 via the physical I/O path 301A. In this case, the block I/F 108 may converts a protocol associated with the network 202A to a protocol associated with the physical I/O path 301A.

Moreover, the block I/F 108 receives a response (hereinafter referred to as a "block access response") corresponding to the block access request from the block control unit 120 via the physical I/O path 301A. The block access response corresponding to the block read request may include read data. The block access response corresponding to the block write request may include the success or failure in a write process. Moreover, the block I/F 108 transmits the received block access response to the host computer 202A via the network 202A. In this case, the block I/F 108 may convert the protocol associated with the physical I/O path 301A to the protocol associated with the network 202A.

The file I/F 109 is coupled so as to be able to perform bidirectional communication with the host computer 200B via a network 202B. Examples of a communication protocol which involves communication via the network 202B include a CIFS (Common Internet File System) and an NFS (Network File System).

The networks 202A and 202B may be separate networks and may be one network. The networks 202A and 202B may be a SAN, a LAN (Local Area Network), a WAN (Wide Area Network), or a combination thereof.

The file I/F 109 is coupled so as to be able to perform bidirectional communication with the block control unit 120 via a physical I/O path 301B. The physical I/O path 301B is also constructed on the internal bus similarly to the physical I/O path 301A.

The file I/F 109 is coupled to the file control unit 130 via a physical control path (hereinafter referred to as a "physical control path") 302. The physical control path 302 is also constructed on the internal bus similarly to the physical I/O paths 301A and 301B.

The file I/F 109 may be a hardware module that includes a processor, a memory, and the like. An example of the file I/F 109 includes an NIC (Network Interface Card) that converts the Ethernet (registered trademark) protocol to the PCIe protocol or vice versa.

The host computer 200B may transmit a file access request which is a file-based access request to the file I/F 109 via the network 202B. The file access request may be referred to as a file I/O request. The data written or read by the file I/O request may be referred to as file I/O data. The file access request may be a request that designates an access destination file according to the CIFS or the NFS. Examples of the file access request include a file read request and a file write request. The data read by the file read request may be referred to as file read data. The data written by the file write request may be referred to as file write data. The file I/F 109 converts the file access request received from the host computer 200B to a block access request so that the block control unit 120 can process the request. Moreover, the file I/F 109 transfers the converted block access request to the block control unit 120 via the physical I/O path 301B. In this case, the file I/F 109 may convert the protocol associated with the network 202B to the protocol associated with the physical I/O path 301B.

Moreover, the file I/F 109 receives a block access response corresponding to the block access request from the block control unit 120 via the physical I/O path 301B. The file I/F 109 converts the received block access response to a response (hereinafter referred to as a "file access response") corresponding to the file access request. The file I/F 109 transmits the converted file access response to the host computer 202B via the network 202B. In this case, the file I/F 109 may convert the protocol associated with the physical I/O path 301B to the protocol associated with the network 202B.

The file control unit 130 may control the file I/F 109 via the physical control path 302. For example, the file control unit 130 may acquire a hardware state of the file I/F 109 via the physical control path 302. The file control unit 130 may set a parameter designated from the management computer 204 to the file I/F 109 via the physical control path 302. The file control unit 130 may control and manage the functions of the file I/F 109 via the physical control path 302. The file control unit 130 may have a function of converting a file access request to a block access request. Moreover, the file control unit 130 may have a function of converting a block access response (for example, block data) to a file access response (for example, file data).

The file I/F 109 may have a so called hardware accelerator function of taking over a portion of the process of the file control unit 130. For example, the file I/F 109 may have a hardware accelerator function of performing a service providing process of a file system and/or a disc I/O process. The file control unit 130 may control a hardware accelerator function of the file I/F 109 via the physical control path 302. The file I/F 109 may have a hardware accelerator function of converting a file access to a block access or vice versa.

The block control unit 120 and the file control unit 130 may be coupled so as to be able to perform bidirectional communication via a logical I/O path (referred to as a "logical I/O path") 303. The logical I/O path 303 may be realized using a queue provided on the memory 110. For example, the file control unit 130 may write data to a predetermined queue on the memory 110 and the block control unit 120 may read data from the queue on the memory 110 whereby transfer of data from the file control unit 130 to the block control unit 120 may be realized. Transfer of data from the block control unit 120 to the file control unit 130 is performed similarly.

The file control unit 130 accesses the logical VOL 111C in which programs executed by the file control unit 130, data and the like are stored via the logical I/O path 303 and the block control unit 120. That is, the logical VOL 111C may be so-called a system disk of the file control unit 130. For example, the file control unit 130 may access the logical VOL 111C via the logical I/O path 303 at the activation time to acquire an activation program, data and the like. For example, when a failure or the like occurs in a subject file control unit 130, the file control unit 130 may store a memory dump in the logical VOL 111C. The memory dump can be used for ascertaining the content of a flowchart occurring in the file control unit 130 and analysis of the causes.

The block control unit 120 and the file control unit 130 may be coupled so as to be able to perform bidirectional communication via a logical control path (referred to as a "logical control path") 304. The logical control path 304 may be realized by a queue or the like via the memory 110 similarly to the logical I/O path 303. In the logical control path 304, control information for controlling operations of programs and the like is transmitted and received rather than a disk access request like a SCSI command. The control information may include, for example, a program shutdown instruction, time information for time synchronization, information for notifying other programs of occurrence of failure or the like, and heartbeat information for judgment of health of the file control unit, and the like. As will be described later, although the logical control path 304 and the logical I/O path 303 are similar in that communication is performed via the memory 110, since purposes and performance requirements thereof are different, the respective queues are preferably realized by independent queues.

Since the logical I/O path 303 and the logical control path 304 are paths structured so as to pass through the memory 110, these paths may be collectively referred to as a memory-through path. Since information that the file control unit 130 exchanges via the logical I/O path 303 and the control information that the file control unit 130 exchanges via the logical control path 304 are exchange of information on internal control of the file control unit 130, these pieces of information may be collectively referred to as an I/O request of internal information. Exchange of information via the memory-through path may be realized by the block control unit 120 or the file control unit 130 detecting update (that is, queuing from a counterpart) of a queue by a method such as polling and processing the content of the queue. Typically, the amount of data exchanged via the logical control path 304 is larger than the amount of data exchanged via the logical I/O path 303. Therefore, the capacity of the memory 110 allocated to each of the logical I/O path 303 and the logical control path 304, a queue size, and/or a polling time interval may be different depending on a communication content or the characteristics thereof. For example, the capacity of the memory 110 allocated to the logical I/O path 303 and/or the queue size may be larger than that of the logical control path 304. For example, the polling time interval of the logical I/O path 303 may be shorter than that the logical control path 304. In this way, the logical I/O path 303 can exchange a larger amount of data in a shorter period than the logical control path 304. That is, the logical I/O path 303 has a larger communication bandwidth and provides a faster communication speed than the logical control path 304.

The block control unit 120 is coupled to the physical I/O paths 301A and 301B, the logical I/O path 303, and the logical control path 304. The block control unit 120 processes requests received via these paths.

Accesses to the logical VOL 111 may be controlled by the block control unit 120. The block control unit 120 may have a storage function for the logical VOL 111. Typical examples of the storage function include a local copy function of creating and managing copies within the storage system 100, a remote copy function of creating and managing copies in another storage system 100, a compression and deduplication function of reducing the amount of data stored, and a layer control function of dynamically moving data between storage apparatuses having different I/O performances and characteristics such as SSD and HDD.

Upon receiving a block read request from the block I/F 108 via the physical I/O path 301A, the block control unit 120 reads user data corresponding to the received block read request from the logical VOL 111A. The block control unit 120 returns the read user data to the block I/F 108 via the physical I/O path 301A.

Upon receiving a block access request from the file I/O 109 via the physical I/O path 301B, the block control unit 120 reads user data corresponding to the received block read request from the logical VOL 111B. The block control unit 120 returns the read user data to the file I/F 109 via the physical I/O path 301B.

Upon receiving a read request for the logical VOL 111C from the file control unit 130 via the logical I/O path 303, the block control unit 120 reads data corresponding to the received read request from the logical VOL 111C. The block control unit 120 passes the data corresponding to the received read request to the file control unit 130 via the logical I/O path 303.

I/O requests for the logical VOLs 111A and 111B from the host computers 200A and 200B require high I/O performance. Therefore, the physical I/O paths 301A and 301B are configured as an internal bus such as PCIe in which high-speed communication can be performed. In this way, the storage system 100A can return I/O responses to the I/O requests from the host computers 200A and 200B at a high speed.

Moreover, a slight low I/O speed for exchange of I/O requests and control information from the file control unit 130 to the logical VOL 111C does not cause a significant problem. Therefore, as described above, the logical I/O path 303 and the logical control path 304 may be constructed as a queue (as a memory-through path) on the memory 110, and the processing speed of the block control unit 120 associated with the logical I/O path 303 and the logical control path 304 may be decreased intentionally so that more processing performance of the block control unit 120 is allocated by the I/O requests from the host computers 200A and 200B.

Figure 2:
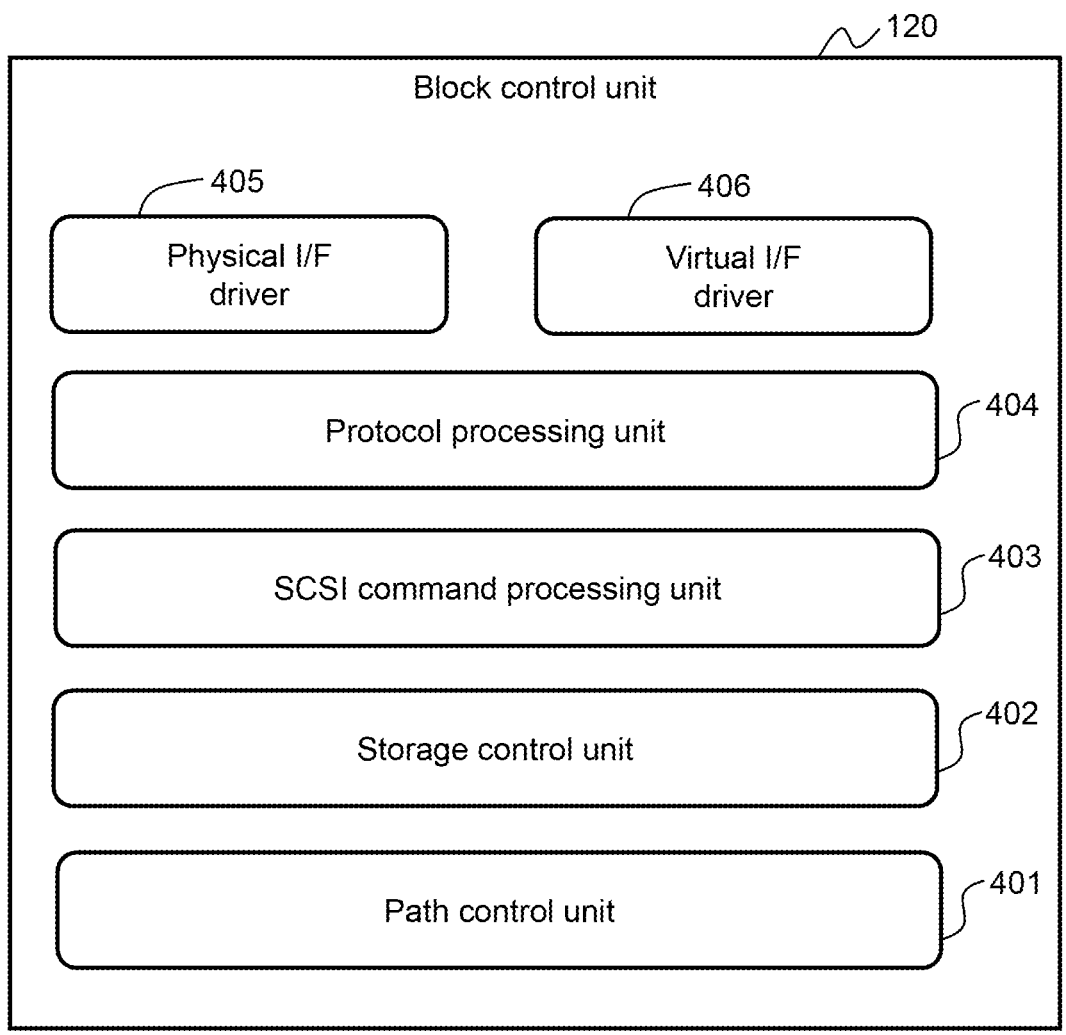
FIG. 2 illustrates an example of functions of a block control unit.

FIG. 2 illustrates an example of the functions of the block control unit 120.

The block control unit 120 may have as its functions, a path control unit 401, a storage control unit 402, a SCSI command processing unit 403, a protocol processing unit 404, a physical I/F driver 405, and a virtual I/F driver 406. These functions may be realized as programs and may be realized as dedicated chips, respectively. The physical I/F driver 405 may be referred to as a physical driver. The virtual I/F driver 406 may be referred to as a virtual driver.

The storage control unit 402 controls the entire storage system 100A. The storage control unit 402 controls I/Os to the logical VOL 111. The storage system 100 has a shared memory which can be accessed from a plurality of storage controllers 101, the storage control unit 402 may perform exclusive control on accesses to the shared memory. The storage control unit 402 may control the plurality of storage apparatuses according to the RAID technology to construct a logical VOL. When a cache memory area is provided on the memory 110, the storage control unit 402 may manage and control caches. The storage control unit 402 may detect a failure in hardware in the storage system 100, remove the failure portion, and notify the management computer 204 of the occurrence of failure.

The SCSI command processing unit 403 analyzes a SCSI command received from the block I/F 108, the file I/F 109, or the file control unit 130 to execute a read process or a write process with respect to the logical VOL 111.

The protocol processing unit 404 analyzes a protocol (FCP or the like) associated with a block access request.

The physical I/F driver 405 performs control unique to respective I/Fs so that the protocol processing unit 404 can access the block I/F 108 via the physical I/O path 301A and access the file I/F 109 via the physical I/O path 301B.

The virtual I/F driver 406 realizes the logical I/O path 303 so that the file control unit 130 accesses the logical volume 111C in cooperation with the protocol processing unit 404. For example, the protocol processing unit 404 corresponds to FCP, the virtual I/F driver 406 may have an emulation function of FCP. In this way, the protocol processing unit 404 and the SCSI command processing unit 403 can deal with data transmitted and received via any of the physical I/O paths 301A and 301B and the logical I/O path 303 as common data according to the FCP. The path control unit 401 and the virtual I/F driver 406 to be described later are common in that both have a function of transmitting and receiving information via the memory 110 but the requirements for the information dealt with are different. Therefore, the processing performances of both may be different depending on the requirement. For example, since the virtual I/F driver 406 is a portion that processes data read and write requests with respect to the logical volume 111C, there may be a case in which the requirements such as timeout are strict. Therefore, it is preferable that the virtual I/F driver 406 can process requests at a high speed. For example, the virtual I/F driver 406 may have a shorter queue polling time interval than the path control unit 401. Alternatively, the virtual I/F driver 406 may have a higher multiplicity in processing requests accumulated in a queue than the path control unit 401.

The path control unit 401 generates and analyzes control information transmitted and received to and from the file control unit 130 via the logical control path 304. The path control unit 401 may control queues on the memory 110 to transmit and receive control information. The control information may be a program shutdown instruction, time information for time synchronization, information for notifying other programs of occurrence of failure or the like, and heartbeat information for judgment of health of the file control unit, and the like. Therefore, the block control unit 120 and the file control unit 130 may transmit and receive control information pursuant to a data format determined in advance between both.

FIG. 3 illustrates a configuration example of an I/O path definition table 112.

The I/O path definition table 112 has pieces of information associated with the physical I/O path and the logical I/O path coupled to the block control unit 120. The I/O path definition table 112 may be contained in the memory 110 and managed by the block control unit 120.

Each record of the I/O path definition table 112 may have as its item values (column values), an I/O path number 221, an I/O path type 222, an initiator 223, and a logical VOL number 224.

The I/O path number 221 is a value for uniquely identifying an I/O path coupled to the block control unit 120.

The I/O path type 222 is a value indicating whether an I/O path corresponding to the I/O path number 221 is a logical I/O path or a physical I/O path.

The initiator 223 is a value for identifying a connection destination (that is, an issuer of an I/O request) module (a hardware module or a program module) of the I/O path corresponding to the I/O path number 221. In FIG. 1, the initiator 223 corresponding to the physical I/O path 301A is the "block I/F 108", the initiator 223 corresponding to the physical I/O path 301B is the "file I/F 109", and the initiator 223 corresponding to the logical I/O path 303 is the "file control unit 130".

The logical VOL number 224 is a value for identifying the logical VOL 111 correlated with the I/O path number 221 (the initiator 223).

The block control unit 120 can recognize the I/O path 301A between the block I/F 108 and the block control unit 120 is the physical I/O path by referring to the record of the I/O path number 221 of "1" in FIG. 3. Moreover, the block control unit 120 can recognize that the I/O request received via the physical I/O path 301A is an I/O request for the logical VOL 111A (the logical VOL for user data of the host computer 200A) corresponding to the logical VOL numbers 224 of "10", "11", and "12". In other words, the number of the logical VOL 111 for the user data provided to the host computer 200A via the block I/F 108 may be stored in the logical VOL number 224 corresponding to the I/O path number 221 of "1". The same is true for the record of the I/O path number 221 of "2".

The block control unit 120 can recognize that the I/O path 303 between the block control unit 120 and the file control unit 130 is the logical I/O path by referring to the record of the I/O path number 221 of "3" in FIG. 3. Moreover, the block control unit 120 can recognize that the I/O path received via the logical I/O path 303 is an I/O request for the logical VOL 111C (the logical VOL for a system disk of the file control unit 130) of the logical VOL number 224 of "201". In other words, the number of the logical VOL 111C for a system disk provided to the file control unit 130 may be stored in the logical VOL number 224 corresponding to the I/O path number 221 of "3". The logical VOL number 224 may be set from the management computer 204.

The block control unit 120 may register a record corresponding to the physical I/O path 301A (or the physical I/O path 301B) in the I/O path definition table 112 upon detecting attachment of the block I/F 108 (or the file I/F 109) to the storage system 100. The block control unit 120 may perform initialization communication with the attached block I/F 108 (or the file I/F 109) to update the initiator 223. The block control unit 120 may acquire register information or the like associated with the hardware of the block I/F 108 (or the file I/F 109) by initialization communication. The block control unit 120 may specify the type of the I/F, an identification number, and a serial number or the like from the acquired register information associated with the hardware. Although not illustrated in the drawing, the I/O path definition table 112 may further have an item value of "polling time interval". The polling time interval may be the interval of a polling process for the block control unit 120 harvesting requests enqueued to the corresponding path. The polling time interval may be 1 millisecond or 10 milliseconds, for example. The value of the polling time interval may be changed according to the type of the I/O path or the type of the initiator so that the polling time interval of the path by the block control unit 120 changes to comply with the performance requirements. For example, when the initiator 223 is the block I/F 108, the file I/F 109, or the like which requires a high performance, the polling time interval may be a minimum value that can be set. When the initiator 223 is the file control unit 130 which does not require such a high performance, the polling time interval may be a relatively large value. Since the performance may be increased by increasing the processing multiplicity for enqueued requests, the polling time interval may be information indicating a relative processing speed such as "High Priority", "Medium Priority", or "Low Priority" instead of a numerical value.

The block control unit 120 may update the initiator 223 corresponding to the logical I/O path 303 by an initialization process. This initialization process may be a process different from the initialization communication. Next, an example of this initialization process will be described.

Figure 4:
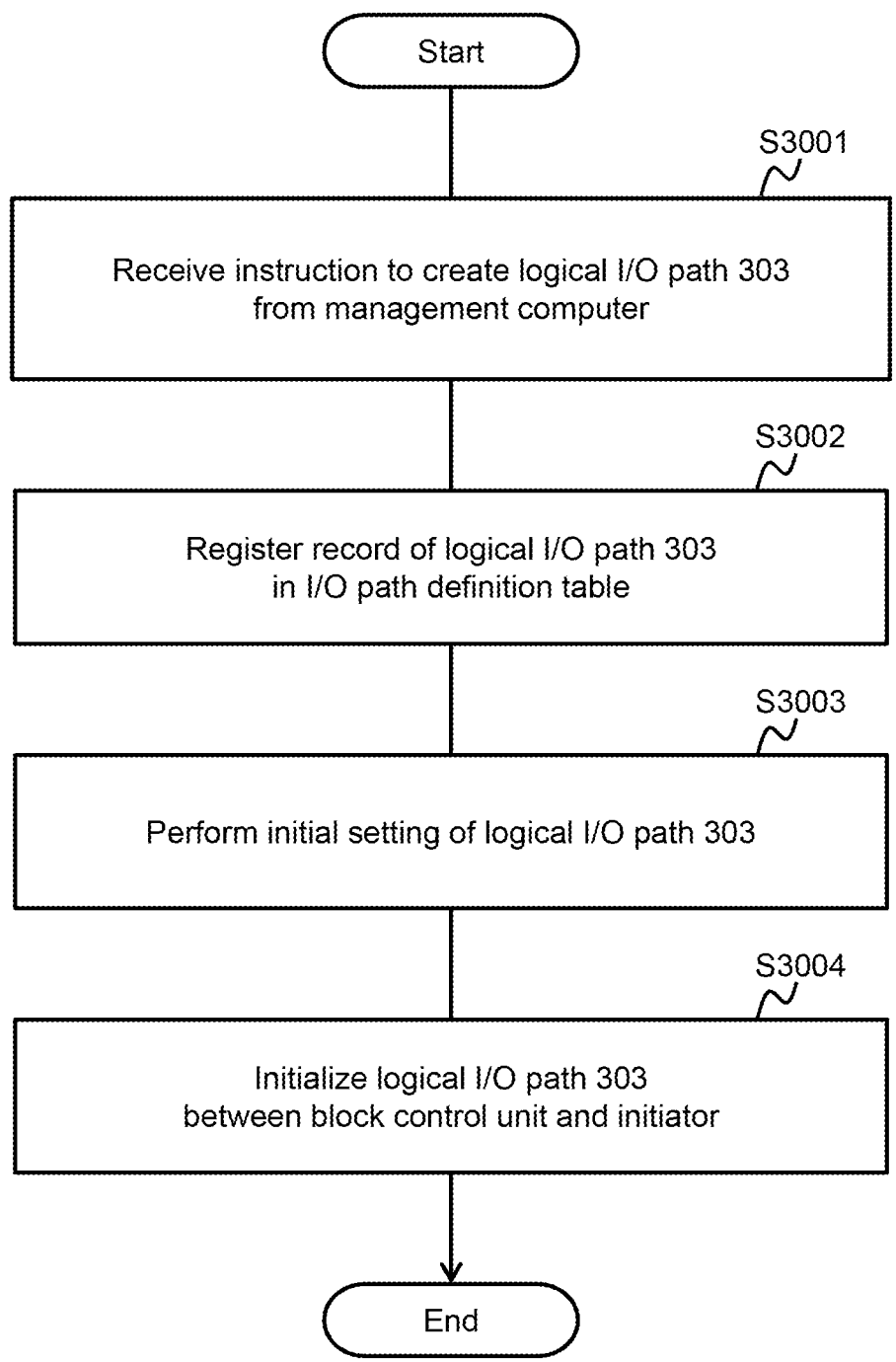
FIG. 4 is a flowchart illustrating an example of an initialization process for a logical I/O path.

FIG. 4 is a flowchart illustrating an example of an initialization process for a logical I/O path.

Upon receiving an instruction to create the logical I/O path 303 from the management computer 204, the block control unit 120 starts the following process (step S3001).

The block control unit 120 generates a record corresponding to the logical I/O path 303 on the basis of the creation instruction received in step S3001 and registers the record in the I/O path definition table 112 (step S3002). When "logical I/O path" is included in the creation instruction, the block control unit 120 may set the "logical I/O path" to the I/O path type 222. When an I/O path number is included in the creation instruction, the block control unit 120 may set the I/O path number to the I/O path number 221. When an I/O path number is not included in the creation instruction, the block control unit 120 may set a new I/O path number 221.

The block control unit 120 performs initial setting of the logical I/O path 303 (step S3003). This initial setting may be performed by the virtual I/F driver 406. For example, the virtual I/F driver 406 creates a queue for exchanging data with the file control unit 130 on the memory 110. When the logical I/O path 303 that emulates the FCP is constructed, the virtual I/F driver 406 may assign a virtual WWN (World Wide Name) to the logical I/O path 303 and create information (for example, size information of a queue created on the memory 110, an entry size of the queue, and the like) for initialization communication with the file control unit 130 serving as the initiator 223. The polling time interval of each of the I/O paths may be set in step S3003.

The block control unit 120 performs initialization of the logical I/O path 303 between the block control unit 120 and the file control unit 130 which is the initiator 223 (step S3004). In this initialization, preparation for exchanging I/O requests is performed between the block control unit 120 and the file control unit 130. When the logical I/O path 303 that emulates the FCP is constructed, the WWN, the queue size, the queue entry size, the polling time interval, and the like are exchanged between the block control unit 120 and the file control unit 130 during this initialization. Moreover, in this initialization, the block control unit 120 may pass the number of the logical VOL 111C allocated for the file control unit 130 to the file control unit 130.

The processes of steps S3001 to S3004 may be performed at appropriate triggering time points. For example, steps S3001 to S3003 may be performed at a triggering time point when an instruction is received from the management computer 204, and step S3004 may be performed at a predetermined triggering time point after the file control unit 130 is activated. The predetermined triggering time point may be a time point at which the block control unit 120 detects an activation completion state of the file control unit 130. Alternatively, the predetermined triggering time point may be a time point at which the file control unit 130 notifies the block control unit 120 of the activation completion via the logical control path 304.

In FIG. 4, although the subsequent processes start when a creation instruction is received from the management computer 204, the present invention is not always limited thereto. For example, when the block control unit 120 is already aware of the configuration of the modules, the I/O paths, and the like included in the storage system 100A, the block control unit 120 may start the processes subsequent to step S3002 upon detecting the activation completion of the file control unit 130. Alternatively, configuration information of the modules, the I/O paths, and the like included in the storage system 100 may be stored in a predetermined nonvolatile memory, and the block control unit 120 may start the processes subsequent to step S3002 when the configuration information is acquired.

Embodiment 2

Figure 5:
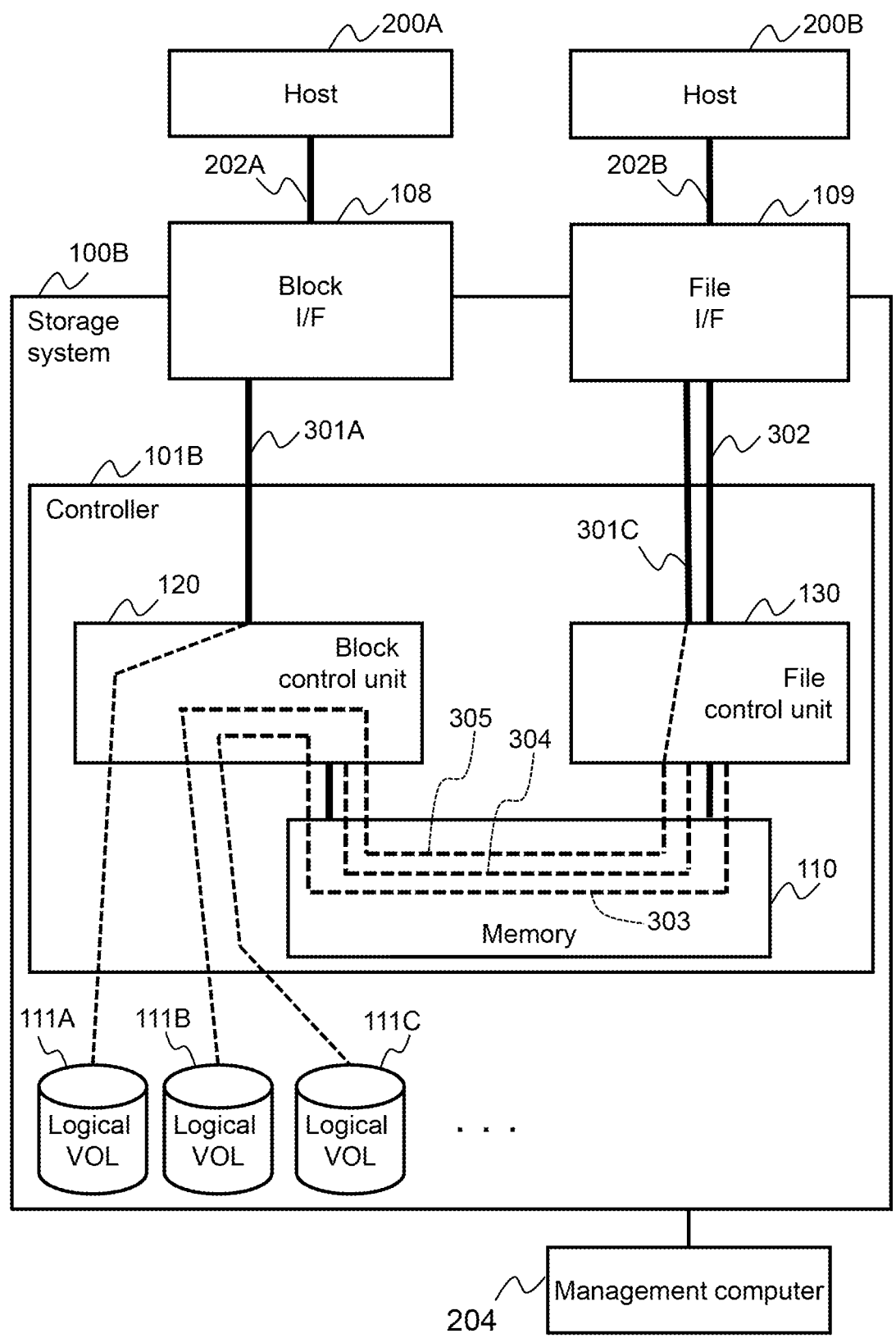
FIG. 5 illustrates a configuration example of a storage system according to Embodiment 2.

FIG. 5 illustrates a configuration example of a storage system according to Embodiment 2. In the drawings associated with Embodiment 2, the same elements as those of Embodiment 1 are sometimes omitted in the drawings. Moreover, in the description of Embodiment 2, the same elements as those of Embodiment 1 are sometimes denoted by the same reference numerals and the description thereof is sometimes omitted.

A storage system 100B according to Embodiment 2 is different from the storage system 100A according to Embodiment 1 in that the block control unit 120 and the file I/F 109 are not coupled to a physical I/O path 301B but the file control unit 130 and the file I/F 109 are coupled to a physical I/O path 301C, and the logical I/O path 305 is added between the block control unit 120 and the file control unit 130.

In the storage system 100B, the physical control path 302 and the physical I/O path 301C may share one physical internal bus.

The logical I/O path 303 is a path for allowing the file control unit 130 to access the logical VOL 111C for the system disk thereof similarly to Embodiment 1.

The logical I/O path 305 is a path for allowing the file I/F 109 (the host computer 200B) to access the logical VOL 111B for user data. That is, the I/O request received by the file I/F 109 from the host computer 200B is transmitted to the block control unit 120 via the physical I/O path 301C and the logical I/O path 305.

The two logical I/O paths 303 and 305 may be constructed as one logical I/O path. In this case, the block control unit 120 manages the number of the logical VOL 111B for the user data allocated to the host computer 200B and the number of the logical VOL 111C for the system disk allocated to the file control unit 130. For example, the block control unit 120 can identify the logical I/O paths 303 and 305 by exchanging the numbers of the logical VOLs 111B and 111C with the file control unit 130 in step S3003 in FIG. 4.

FIG. 6 illustrates a configuration example of an I/O path definition table according to Embodiment 2.

The I/O path definition table 112 may have the same configuration as Embodiment 1.

The block control unit 120 can recognize that the I/O path 305 between the block control unit 120 and the file control unit 130 is a logical I/O path by referring to the record of the I/O path number 221 of "2" of the I/O path definition table 112 in FIG. 6. Here, the initiator 223 of this record is the "file control unit 130". However, as described above, the block control unit 120 can recognize that the I/O request received via the logical I/O path 305 is an I/O request received (from the host computer 200B) via the physical I/O path 301C by exchanging the logical VOL number 224 of "101", "102", and "103" corresponding to the physical I/O path 301C (the file I/F 190 or the host computer 200B) with the file control unit 130. Similarly to FIG. 3, the I/O path definition table 112 in FIG. 6 may further have an item value associated with a processing performance such as a polling time interval for each I/O path. In Embodiment 2, although the logical I/O path 305 is a path for accessing user data and requires a relatively high performance, the logical I/O path 303 is a path for accessing a system disk and does not require such a high performance. Due to this, the polling time interval of the logical I/O path 305 may be set to a relatively small value and the polling time interval of the logical I/O path 303 may be set to a relatively large value. In this way, the block control unit 120 can perform processing corresponding to the performance requirements of each path.

Embodiment 3

Figure 7:
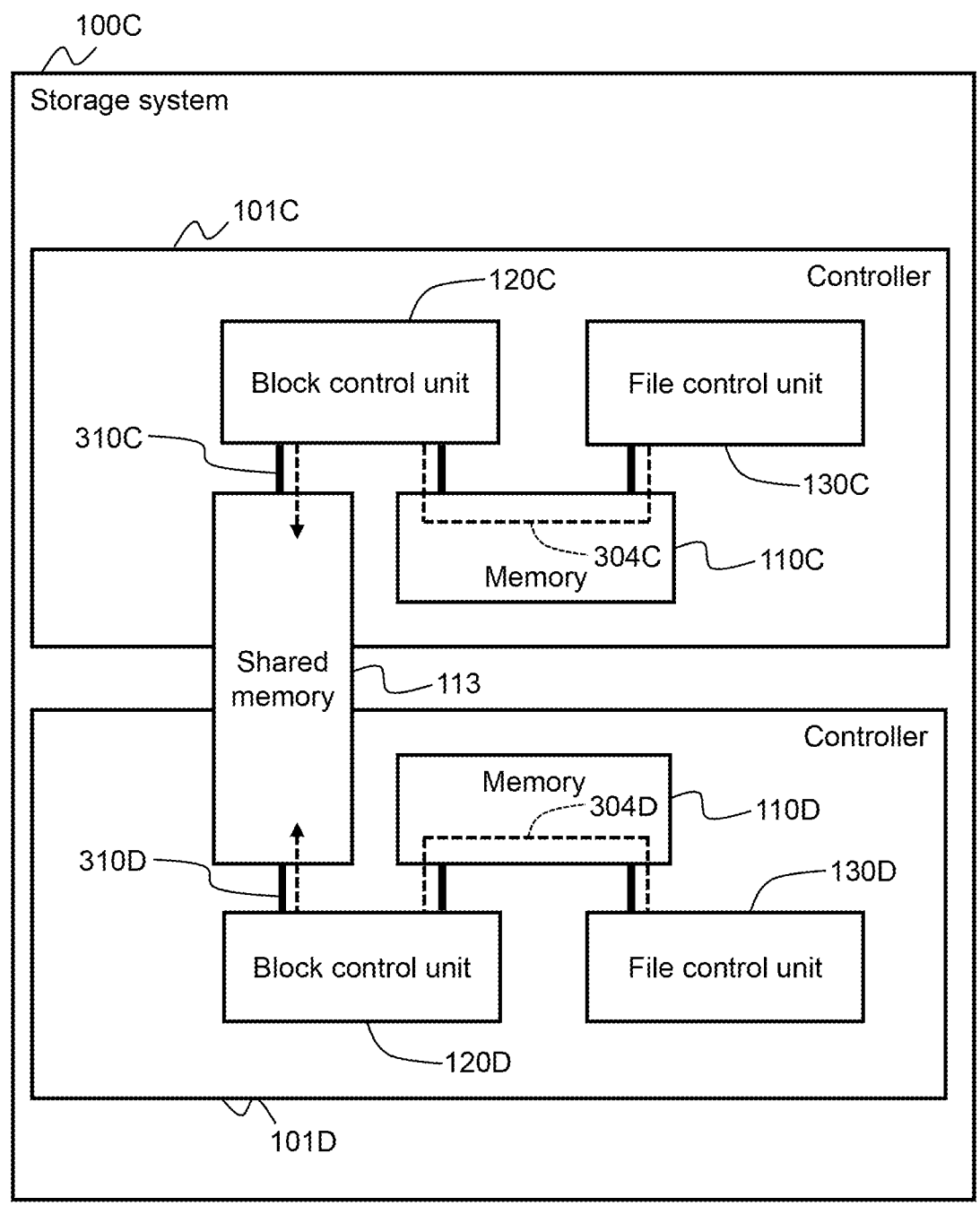
FIG. 7 illustrates a configuration example of a storage system according to Embodiment 3.

FIG. 7 illustrates a configuration example of a storage system 100C according to Embodiment 3. In the drawings associated with Embodiment 3, the same elements as those of Embodiment 1 or 2 are sometimes omitted in the drawings. Moreover, in the description of Embodiment 3, the same elements as those of Embodiment 1 or 2 are sometimes denoted by the same reference numerals and the description thereof is sometimes omitted.

The storage system 100C includes a plurality of controllers 101C and 101D. The storage system 100C includes a shared memory 113 that can be accessed from the plurality of controllers 101C and 101D. Each controller 101 may include a block control unit 120, a file control unit 130, and a memory 110 similarly to Embodiment 1. The memory 110 may be physically replaced with the shared memory 113. In the storage system 100C illustrated in FIG. 7, the controller 101C includes a block control unit 120C and a file control unit 130C, and the controller 101D has a block control unit 120D and a file control unit 130D. Each of the controllers 101C and 101D may be referred to as a cluster.

The block control units 120C and 120D can access the shared memory 113 via physical buses 310C and 310D, respectively. A data sharing method in the shared memory 113 may follow a general exclusive control method.

State information of hardware components included in the storage system 100C may be stored in the shared memory 113. A caching area in which the block control unit 120 temporarily stores user data may be provided in the shared memory 113. Control information or the like of the respective functions of the block control unit 120 may be stored in the shared memory 113.

These pieces of information stored in the shared memory 113 are important information for maintaining the reliability of the storage system 100C. Therefore, it is problematic that these pieces of information stored in the shared memory 113 are rewritten or deleted illegally. Therefore, the storage system 100C may be configured such that the block control unit 120 having high reliability only can access the shared memory 113. In this case, since the block control units 120C and 120D of the controllers 101C and 101D can access the shared memory 113 directly, the block control units 120C and 120D can acquire the mutual state information and monitor the health state (perform health check) using the shared memory 113. However, since the file control units 130C and 130D of the controllers 101C and 101D cannot access the shared memory 113 directly, the file control units 130C and 130D cannot perform the above-mentioned operations. The present embodiment is an example of the storage system 100C in which in such a configuration, the file control units 130C and 130D of the controllers 101C and 101D can acquire the mutual state information and monitor the health state.

Figure 8:
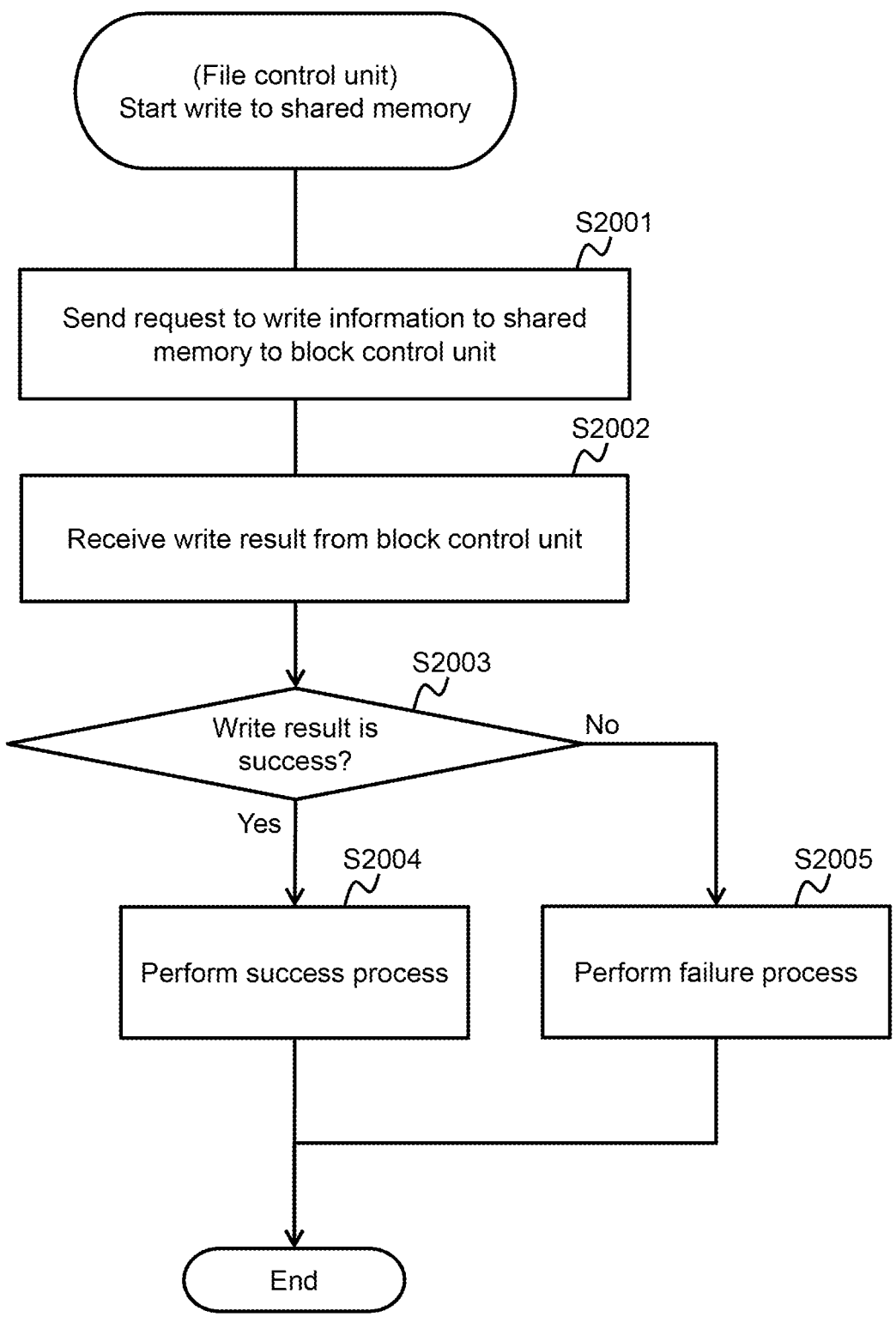
FIG. 8 is a flowchart illustrating a processing example in which a file control unit writes state information to a shared memory.

FIG. 8 is a flowchart illustrating a processing example in which the file control unit 130C writes state information to the shared memory 113. The same is true for the file control unit 130D.

The file control unit 130C issues a write request to write the state information of the file control unit 130C to the shared memory 113 to the block control unit 120C via the logical control path 304C (step S2001). The write request may include a starting address (referred to as a "write destination address") of a write destination area, a state information length, and the state information. A storage area of the state information (the health information) of the file control unit 130 in the shared memory 113 may be referred to as a health area.

The block control unit 120C having received this write request writes the state information of the file control unit 130C to the shared memory 113 after ascertaining that the write destination address, the state information length, and the like included in the write request are not wrong values. In this case, the block control unit 120C performs exclusive control with respect to the write destination area of the shared memory 113. This is to prevent collision with a write process of another block control unit 120D on the same area. The block control unit 120C returns a write result of the writing to the shared memory 113 to the file control unit 130C.

Examples of a case in which the write fails include a case in which the write request has a wrong value and a case in which the exclusive control of the shared memory 113 fails. A write result indicating a failure may include information indicating the content of the failure. This is to allow the file control unit 130C having received the write result to perform retry or the like as necessary.

Upon receiving the write result from the block control unit 120C (step S2002), the file control unit 130C determines the success or failure in the write to the shared memory 113 on the basis of the write result (step S2003).

When the result of the write to the shared memory 113 is a success (step S2003: YES), the file control unit 130C performs a success process (step S2004). The success process involves writing information indicating that a success in writing the state information to the memory 110C, for example.

When the result of the write to the shared memory 113 is a failure (step S2003: NO), the file control unit 130C performs a failure process (step S2005). The failure process may differ depending on the content of a failure included in the write result. For example, the file control unit 130C may be reactivated when the content of the failure indicates that the write request was a wrong value. This is because a program fault of the file control unit 130 is questionable. For example, when the content of the failure indicates a failure in the exclusive control, the file control unit 130C may retry the write request after a predetermined time is elapsed.

Figure 9:
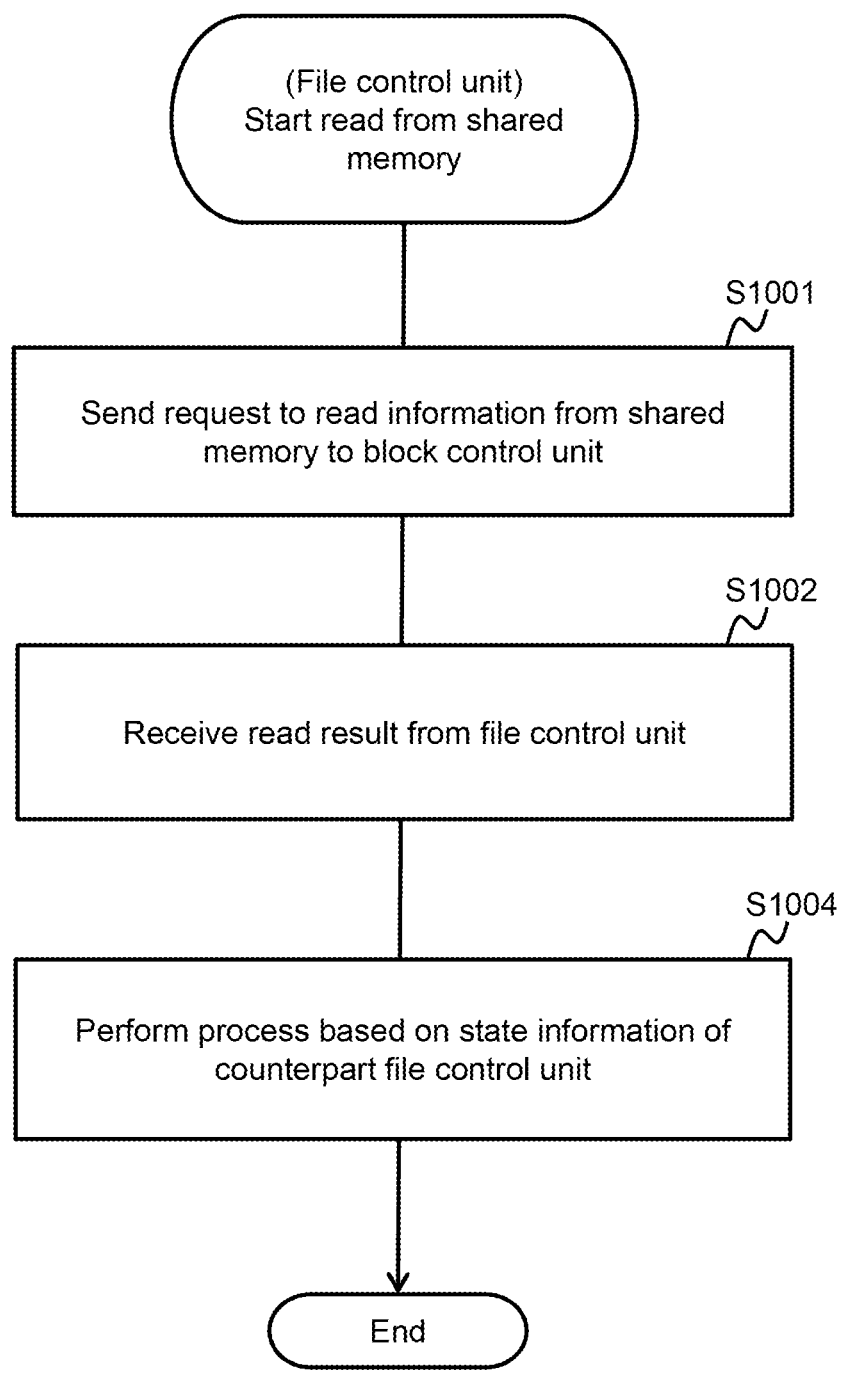
FIG. 9 is a flowchart illustrating a processing example in which a file control unit reads state information of another file control unit from a shared memory.

FIG. 9 is a flowchart illustrating a processing example in which the file control unit 130D reads the state information of another file control unit 130C from the shared memory 113. The same is true for the file control unit 130C.

The file control unit 130D issues a read request to read the state information of the file control unit 130D from the shared memory 113 to the block control unit 120D via the logical control path 304D (step S1001). The read request may include a starting address (referred to as a "read destination address") of a read destination area and the state information length.

The block control unit 120D having received this read request reads the state information of the file control unit 130C from the shared memory 113 after ascertaining that the read destination address, the state information length, and the like included in the read request are not wrong values. The block control unit 120D returns a read result including the acquired state information to the file control unit 130D.

Upon receiving the read result from the block control unit 130D (step S1002), the file control unit 120D performs a predetermined process on the basis of the state information of the file control unit 130C included in the read result (step S1004). For example, the file control unit 120D determines whether the file control unit 130C is operating normally on the basis of the state information.

The processes illustrated in FIGS. 8 and 9 may be performed periodically and may be performed when it is necessary for the file control unit 130 to update or refer to the shared memory 113.

By combining the processes illustrated in FIGS. 8 and 9, the file control units 130C and 130D of the controllers 101C and 101D can perform communication via the shared memory 113. Therefore, the file control units 130C and 130D can perform heartbeat communication using the shared memory 113. In this way, when the file control unit 130D detects an abnormal state of the file control unit 130C, the file control unit 130D can take over the providing service of the file control unit 130C. That is, it is possible to realize a failover mechanism. In this case, the file control unit 130D taking over the service needs to take over the execution state of the file control unit 130C correctly. Therefore, the file control units 130C and 130D stores the state information associated with the services in execution appropriately in the shared memory 113. In this way, the file control unit 130D can acquire the state information associated with the service being executed by the file control unit 130C from the shared memory 113 and take over the execution state of the file control unit 130C.

The storage system 100C may be configured such that the controllers 101C and 101D are coupled via a communication network such as LAN and the file control units 130C and 130D communicate directly via the communication network. In this case, the file control units 130C and 130D can perform heartbeat communication and exchange state information via the communication network. Since the exchange of information via the communication network is performed without via the logical control path 304 and the block control unit 120, the processing load of the block control units 120C and 120D is reduced. However, when a failure occurs in the communication network, the file control units 130C and 130D cannot receive communication from their counterpart, it is not possible to know which one of the file control units 130C and 130D will take over the service (which one will remain alive).

In preparation for such a case, the file control units 130C and 130D may store the state information in the shared memory 113 appropriately. This can be realized by combining the processes illustrated in FIGS. 8 and 9. For example, it is assumed that a failure occurred in a communication network and the file control units 130C and 130D detected disconnection of the heartbeat communication. In this case, the file control units 130C and 130D write their health information to the shared memory 113 on the basis of the process illustrated in FIG. 9. As described above, only one of the write processes to the shared memory 113 succeeds due to the exclusive control of the block control units 120C and 120D. That is, even if the file control units 130C and 130D have detected disconnection of the heartbeat communication and the file control units 130C and 130D have written their health information to the shared memory 113 simultaneously, due to the exclusive control of the block control units 120C and 120D, the write process of one of the file control units succeeds and the write process of the other file control unit fails. Therefore, the above-mentioned problem can be solved by defining that a file control unit which has written the health information to the shared memory 113 earlier than the other takes over the service of the counterpart file control unit. For example, a file control unit having received a write result indicating a failure in the exclusive control may stop its execution and a file control unit having received a write request indicating a success in the exclusive control may take over the service of the counterpart. In this way, it is possible to alleviate the processing load of the block control unit 120 and to enhance the availability of the file control unit 130. For example, after the file control unit 130 detects disconnection of the heartbeat communication with the counterpart file control unit 130 and performs the process illustrated in FIG. 8, the file control unit 130 may send a request to the block control unit 120 via the logical control path 304 so that the file control unit 130 having received a write result indicating a success in the exclusive control reactivates the counterpart file control unit 130, and the block control unit 120 may reactivate the file control unit 130 having received the result indicating a failure in the exclusive control according to the request.

The file control units 130C and 130D may store health information and state information in the logical VOL 111C for a system disk which can be accessed from both file control units. In this case, the same can be realized by using the logical VOL 111C as a so-called Quorum Disk.

According to Embodiment 3, a file control unit of one controller can directly monitor the health of a file control unit of a counterpart controller. Therefore, the block control unit may only need to perform exclusive control on the shared memory and does not need to monitor the health of the file control unit. In this way, the block control unit can use its resources in processing block accesses to the logical VOL. Therefore, it is possible to enhance the I/O performance of the storage system with respect to the host computer.

Moreover, when the storage system receives and processes both file I/O and block I/O from the host computer, the processing load of the block control unit increases further. Therefore, the difference in processing load between the block control unit and the file control unit increases further. In such a case, by offloading the health monitoring function to the file control unit, it is possible to further improve the utilization efficiency of the resources of the storage system.

Moreover, when the file control units monitor their health directly, the processing load of the file control unit may increase. However, in this case, as described in Embodiment 1, at least a portion of the processes of the file control unit may be taken over to the file I/F.

By combining Embodiments 1 and 3, it is possible to construct a storage system in which a block I/O request (and a block I/O data) and a file I/O request (and a file I/O data) are transferred via a physical I/O path, an I/O request (and internal information) associated with internal information is exchanged via a memory-through path, the burden of monitoring the health of a file control unit is offloaded from a block control unit to the file control unit, and the processing load of the file I/O request (and the file I/O data) is offloaded from the file control unit to the file I/F. In this way, since the resource utilization efficiency of the entire storage system is improved, the I/O performance of the storage system with respect to the host computer is improved.

While several embodiments have been described, these embodiments are examples for describing the present invention, and the scope of the present invention is not limited to these embodiments only. The present invention can be implemented in various other forms.

The control information transmitted and received via the logical control path may include the state information indicating the internal state of the file control unit 130. In this case, the block control unit 120 may acquire the state information of the file control unit 130 via the logical control path. The block control unit 120 may transmit the state information of the block control unit 120 itself and the acquired state information of the file control unit 130 collectively to the management computer 204. The management computer 204 may display the internal states of the block control unit 120 and the file control unit 130 in the storage system 100 on a GUI collectively on the basis of the state information transmitted from the block control unit 120. The state information may include information indicating whether the file control unit 130 is operating normally.

A file I/F 109 which has a plurality of hardware components and which can be replaced in units of hardware components may be considered. In this case, a component in which a failure occurred and a replacement order of the component may be displayed on a GUI. Therefore, the block control unit 120 may acquire the state of a hardware component inside the file I/F 109 via the physical control path 302 and the logical control path 304 and display the acquired result on a GUI. In this way, users can be aware of the state of the storage system 100 via a unified GUI provided by the block control unit 120. Examples of a hardware component inside the file I/F 109 include DIMM (Dual Inline Memory Modules) and SFP (Small Form Factor Pluggable).

In preparation for hang-up of the file control unit 130, the block control unit 120 may monitor the health of the file control unit 130. In this case, the block control unit 120 may reactivate the file control unit 130 upon detecting an abnormality in the file control unit 130. For example, the block control unit 120 may detect an abnormality in the file control unit 130 on the basis of disconnection of heartbeat communication. For example, the file control unit 120 may issue an inter-processor interrupt signal to the block control unit 120 when an abnormality occurs. For example, the file control unit 130 may notify the block control unit 120 of the occurrence of abnormality via the logical control path 304.

The block control unit 130 may issue an inter-processor interrupt signal to the file control unit 130 to reactivate the file control unit 130. The file control unit 130 may be reactivated after outputting its memory dump via the logical I/O path 303 upon detecting the inter-processor interrupt.

Since the block control unit 120 controls accesses to the logical VOL 111, it is necessary to stop the file control unit 130 when a failure occurs in the block control unit 120. Therefore, the block control unit 120 and the file control unit 130 may perform heartbeat communication via the logical control path 304, and the file control unit 130 may stop the file control unit 130 upon detecting disconnection of the heartbeat communication from the block control unit 120. Alternatively, the file control unit 130 may issue a predetermined command periodically to the block control unit 120 via the logical I/O path 303 and may stop the file control unit 130 upon detecting disconnection of a response to the predetermined command.

The contents according to the embodiments can be expressed as follows.

(Expression 1)

A storage system including: a block I/F that receives a block I/O request from a host computer;

a block control unit that is coupled to the block I/F by a physical path so as to control the block I/O request received by the block I/F;

a file control unit that provides a file server to the host computer; and a first shared memory that is shared by the block control unit and the file control unit, wherein the file control unit and the block control unit are coupled by:

a first memory-through path structured so as to pass through a first area of the first shared memory; and a second memory-through path structured so as to pass through a second area of the first shared memory, the block control unit includes:

a protocol processing unit that processes a protocol associated with transfer of data via the physical path; and a virtual driver that converts exchange of data via the first or second memory-through path to a protocol that can be processed by the protocol processing unit, and the block control unit:

exchanges control information on control of the file control unit with the file control unit via the first memory-through path;

uses the virtual driver to convert an I/O request passed from the file control unit via the second memory-through path, and processes the result using the protocol processing unit; and bypasses the virtual driver and uses the protocol processing unit to process a block I/O request transferred from the block I/F via the physical path.

(Expression 2)

The storage system according to Expression 1, further including: a plurality of clusters each including a file control unit and a block control unit; and a second shared memory that can be accessed from the block control units of the plurality of clusters, wherein the second shared memory has a health area in which health information of the file control unit of each cluster is stored, and in each cluster, upon receiving an I/O request for the health information from the file control unit, the block control unit performs exclusive control with respect to the health area and returns an execution result of the I/O request for the health information with respect to the health area to the file control unit via the first memory-through path, and the file control unit determines the health of the file control unit of another cluster on the basis of the execution result of the I/O request for the health information returned from the block control unit.

(Expression 3)

The storage system according to Expression 1, further including: a file I/F that receives a file I/O request from the host computer, wherein the file I/F is coupled to the block control unit by a physical path that is faster than the first and second memory-through paths, and the file I/F converts the file I/O request received from the host computer to a block I/O request and transfers the converted block I/O request to the block control unit via the physical path.

(Expression 4)

The storage system according to any one of Expressions 1 to 3, wherein the block control unit manages whether the type of paths coupled to the block control unit is the physical path or the first or second memory-through path and performs different processes depending on the type of the path.

(Expression 5)

The storage system according to any one of Expressions 1 to 4, wherein the second memory-through path is faster than the first memory-through path.

(Expression 6)

The storage system according to any one of Expressions 1 to 5, wherein the file control unit monitors the health of the block control unit via the first memory-through path and stops execution of the file control unit when it cannot be confirmed that the block control unit is active.

(Expression 7)

The storage system according to any one of Expressions 1 to 6, wherein the second area has a larger capacity than the first area.

(Expression 8)

The storage system according to any one of Expressions 1 to 7, wherein a polling interval of the block control unit with respect to the second area is shorter than a polling interval thereof with respect to the first area.

(Expression 9)

The storage system according to Expression 1, further including: a file I/F that receives a file I/O request from the host computer, wherein the file I/F is coupled to the file I/F by a physical path that is faster than the first and second memory-through paths, the file control unit and the block control unit are coupled by a third memory-through path structured so as to pass through a third area of the first shared memory, the third memory-through path being faster than the first and second memory-through paths, the file I/F transfers the file I/O request received from the host computer to the file control unit via the physical path, and the file control unit converts the file I/O request transferred from the file I/F to a block I/O request and passes the converted block I/F request to the block control unit via the third memory-through path.

(Expression 10)

A storage control method in a storage system including: a block I/F that receives a block I/O request from a host computer;

a block control unit that is coupled to the block I/F by a physical path so as to control the block I/O request received by the block I/F;

a file control unit that provides a file server to the host computer; and a shared memory that is shared by the block control unit and the file control unit, wherein the file control unit and the block control unit are coupled by:

a first memory-through path structured so as to pass through a first area of the shared memory; and a second memory-through path structured so as to pass through a second area of the first shared memory, the block control unit includes:

a protocol processing unit that processes a protocol associated with transfer of data via the physical path; and a virtual driver that converts exchange of data via the first or second memory-through path to a protocol that can be processed by the protocol processing unit, and the block control unit:

exchanges control information on control of the file control unit with the file control unit via the first memory-through path;

uses the virtual driver to convert an I/O request passed from the file control unit via the second memory-through path, and processes the result using the protocol processing unit; and bypasses the virtual driver and uses the protocol processing unit to process a block I/O request transferred from the block I/F via the physical path.

REFERENCE SIGNS LIST

100 Storage system
200 Host computer
101 Storage controller
108 Block I/F
109 File I/F
110 Memory
111 Logical volume
120 Block control unit
130 File control unit

The invention claimed is:

1. A storage system comprising:
a block I/F configured to receive a block I/O request from a host computer;
a block control unit coupled to the block I/F by a physical path so as to control the block I/O request received by the block I/F;
a file control unit configured to provide a file server to the host computer; and
a first shared memory shared by the block control unit and the file control unit, wherein
the file control unit and the block control unit are coupled by:
a first memory-through path structured so as to pass through a first area of the first shared memory; and
a second memory-through path structured so as to pass through a second area of the first shared memory,
the block control unit includes:
a protocol processing unit configured to process a protocol associated with transfer of data via the physical path; and
a virtual driver configured to convert exchange of data via the first or second memory-through path to a protocol that can be processed by the protocol processing unit, and
the block control unit is configured to:
exchange control information on control of the file control unit with the file control unit via the first memory-through path;
use the virtual driver to convert an I/O request passed from the file control unit via the second memory-through path, and process the result using the protocol processing unit; and
bypass the virtual driver and use the protocol processing unit to process a block I/O request transferred from the block I/F via the physical path.

2. The storage system according to claim 1, further comprising:
a plurality of clusters each including a file control unit and a block control unit; and
a second shared memory that can be accessed from the block control units of the plurality of clusters, wherein
the second shared memory has a health area in which health information of the file control unit of each cluster is stored, and
in each cluster,
the block control unit is configured to, upon receiving an I/O request for the health information from the file control unit, perform exclusive control with respect to the health area and return an execution result of the I/O request for the health information with respect to the health area to the file control unit via the first memory-through path, and
the file control unit is configured to determine the health of the file control unit of another cluster on the basis of the execution result of the I/O request for the health information returned from the block control unit.

3. The storage system according to claim 1, further comprising:
a file I/F configured to receive a file I/O request from the host computer, wherein
the file I/F is coupled to the block control unit by a physical path that is faster than the first and second memory-through paths, and
the file I/F is configured to convert the file I/O request received from the host computer to a block I/O request, and transfer the converted block I/O request to the block control unit via the physical path.

4. The storage system according to claim 3, wherein
the block control unit is configured to manage whether the type of paths coupled to the block control unit is the physical path or the first or second memory-through path, and perform different processes depending on the type of the path.

5. The storage system according to claim 4, wherein
the second memory-through path is faster than the first memory-through path.

6. The storage system according to claim 1, wherein
the file control unit is configured to monitor the health of the block control unit via the first memory-through path, and stop execution of the file control unit when it cannot be confirmed that the block control unit is active.

7. The storage system according to claim 1, wherein
the second area has a larger capacity than the first area.

8. The storage system according to claim 1, wherein
a polling interval of the block control unit with respect to the second area is shorter than a polling interval thereof with respect to the first area.

9. The storage system according to claim 1, further comprising:
a file I/F configured to receive a file I/O request from the host computer, wherein the file I/F is coupled to the file I/F by a physical path that is faster than the first and second memory-through paths, the file control unit and the block control unit are coupled by a third memory-through path structured so as to pass through a third area of the first shared memory, the third memory-through path being faster than the first and second memory-through paths, the file I/F is configured to transfer the file I/O request received from the host computer to the file control unit via the physical path, and the file control unit is configured to convert the file I/O request transferred from the file I/F to a block I/O request, and pass the converted block I/F request to the block control unit via the third memory-through path.

10. A storage control method in a storage system comprising:

a block I/F that receives a block I/O request from a host computer;

a block control unit that is coupled to the block I/F by a physical path so as to control the block I/O request received by the block I/F;

a file control unit that provides a file server to the host computer; and a shared memory that is shared by the block control unit and the file control unit, wherein the file control unit and the block control unit are coupled by:

a first memory-through path structured so as to pass through a first area of the shared memory; and a second memory-through path structured so as to pass through a second area of the first shared memory, the block control unit includes:

a protocol processing unit that processes a protocol associated with transfer of data via the physical path; and a virtual driver that converts exchange of data via the first or second memory-through path to a protocol that can be processed by the protocol processing unit, and the block control unit:

exchanges control information on control of the file control unit with the file control unit via the first memory-through path;

uses the virtual driver to convert an I/O request passed from the file control unit via the second memory-through path, and processes the result using the protocol processing unit; and bypasses the virtual driver and uses the protocol processing unit to process a block I/O request transferred from the block I/F via the physical path.

* * * * *